United States Patent [19]
Mercier

[11] Patent Number: 5,953,054
[45] Date of Patent: *Sep. 14, 1999

[54] METHOD AND SYSTEM FOR PRODUCING STEREOSCOPIC 3-DIMENSIONAL IMAGES

[75] Inventor: Denis Mercier, St-Alphonse-de-Granby, Canada

[73] Assignee: Geo-3D Inc., Quebec, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/658,870

[22] Filed: May 31, 1996

[51] Int. Cl.⁶ .......................... H04N 15/00; H04N 15/02; H04N 13/02; H04N 13/04
[52] U.S. Cl. ................ 348/50; 348/51; 382/154
[58] Field of Search .................. 348/42, 44, 50, 348/51; 382/154; H04N 13/02, 15/02, 13/04, 15/00

[56] References Cited

U.S. PATENT DOCUMENTS

| | | | |
|---|---|---|---|
| 3,527,880 | 9/1970 | Gordon | 348/50 |
| 4,613,899 | 9/1986 | Kuwano et al. | 348/50 |
| 4,807,024 | 2/1989 | McLaurin et al. | 348/50 |
| 4,994,898 | 2/1991 | Ling et al. | 348/44 |
| 5,157,484 | 10/1992 | Pritchard et al. | 348/50 |
| 5,510,832 | 4/1996 | Garcia | 348/42 |
| 5,530,774 | 6/1996 | Fogel | 348/50 |

*Primary Examiner*—Bryan Tung
*Assistant Examiner*—Nhon T. Diep
*Attorney, Agent, or Firm*—David M. Carter; James Anglehart; Guy Houle

[57] ABSTRACT

A method and a system for producing stereoscopic 3-dimensional images from a single motion picture video film having a plurality of frames containing successive images which are produced from a single video camera in motion. The motion picture video film is produced by displacing the camera along an axis with a viewing axis of the camera oriented substantially perpendicular to the axis of displacement of the camera. Images of the motion picture video film are overlaid or alternated in a synchronized fashion and separated by a time sequence to produce video signals of composite images capable of producing 3-dimensional images which can be viewed on a screen with eyeglasses having lenses conditioned to view separate ones of the overlaid or alternating images, simultaneously, whereby a viewer person can observe a depth of field in the composite images. The video signals can be derived by using two film copies each feeding an associated one of two recording devices to produce time separated video signals which are multiplexed and then recorded in a further recording device to produce a video film of the composite images. The video signals may be produced by the use of a computer with composite image digital signals stored in the memory of the computer.

5 Claims, 3 Drawing Sheets

— 1 —

METHOD AND SYSTEM FOR PRODUCING STEREOSCOPIC 3-DIMENSIONAL IMAGES

TECHNICAL FIELD

The present invention relates to a method and a system for producing stereoscopic 3-dimensional images from a single motion picture video film having a plurality of frames containing successive images which are produced from a single video camera in motion with the object being filmed remaining substantially stationary.

BACKGROUND ART

Stereoscopic 3-dimensional imaging systems have been known for quite some time and produce overlaid images that are projected on a screen and viewed by the use of special eyeglasses of which the lenses are conditioned so that each eye views a distinct one of the overlaid images to view a subject from different angles and thereby create a perception of depth of field. Usually the stereoscopic film is produced by utilizing two cameras to obtain two different films each having a different perspective of the subject being filmed. With such a system the positioning of the cameras becomes very critical and the production of such films is therefore time-consuming, costly and has limited applications. Such techniques have also found technical applications and particularly in the field of endoscopy and microscopy.

When the subject being filmed is far away, the distance between the cameras must be augmented considerably in order to obtain a stereoscopic effect to simulate a depth of field of what would be naturally seen by the human eyes. However, if a stereoscopic film had to be produced from, for example, an aircraft flying at an altitude of 1000 meters, with the subject on the ground, the distance between two cameras would have to be several meters. However, it is practically impossible to separate two cameras in an aircraft having sufficient spacing to produce stereoscopic images of such subject as the separation of the cameras is restricted by the length of the fuselage of the aircraft.

In U.S. Pat. 4,807,024, issued Feb. 21, 1989, to the University of South Carolina, there is described an apparatus and a method for producing 3-dimensional images by using a single camera mounted on a platform moving at constant velocity and spacing with respect to a subject to be imaged. This system is characterized in that the 3-dimensional images can be viewed without the use of special eyeglasses and that the images on the screen are displaced from the top to the bottom of the screen. This system alternates the frames of the films at an average frequency of 10 frames per second but this could vary between 4 and 30 frames. Two work prints are placed in an optical printer and aligned for printing with corresponding images in the two prints offset from each other by a sufficient number of frames so that the resulting print contains images that evolve in time with alternating view points that differ in vertical parallax. It is disclosed that by employing a video camera and video processing, high quality 3-dimensional images may be generated in near real-time and viewed without the use of special glasses or other aids.

SUMMARY OF INVENTION

The present invention utilizes the principle as disclosed in the above patent reference in that stereoscopic images can be produced from a single motion picture video film taken of a subject by displacing a single video camera along an axis with the subject remaining substantially stationary. Preferably, the angle between the camera and the subject should be substantially perpendicular to the axis in which the camera is displaced in the monitor and the images recorded of the subject are displaced from left to right or right to left. By shifting and overlaying the images we can therefore create, synthetically, a second point of view from a single motion picture film strip. The method and system of the present invention shifts the images and orients them with a time delay in either a superimposed manner or alternating manner by the use of multiplexing. The delay sequence of the overlaid images can vary from a few frames to many seconds. The composite image which is therefore created must be visualized at 30 or 60 frames per second, depending on the system used, in order to create a real-time sequence. Special eyeglasses having lenses treated to view the superimposed images are required in order to view them in stereoscopic 3-dimension. Depending on the orientation of the delayed images, either arranged for superimposition or alternating sequencing, special eyeglasses are required to view them on screen. These eyeglasses may have polarized or shutter lenses, or other type lenses depending on the projecting system utilized.

In another of its application, the present invention utilizes a computer system using PC computers, video cards and processors which can permit the creation of 3-dimensional images from a film containing a plurality of images created by a single video camera.

With the method and system of the present invention, the time delay between the superimposed or alternating images taken from two copies of a single film strip or from digital signals stored in a computer and representative thereof, can be modified in relation to the desired effect or to compensate for the speed of displacement of the camera or the distance between the camera and the subject being filmed. Accordingly, the resultant 3-dimensional stereoscopic film may be the result of a composition of various sequences of time delays along the film strip whereby to produce desired 3-dimensional effects. The camera may be positioned in an aircraft or a land vehicle or even a boat or any other displaceable means that can produce continuous camera displacement along an axis and in a substantially stable manner. It is also preferable that the subject being filmed be substantially motionless.

According to a broad aspect of the present invention there is therefore provided a method of producing stereoscopic 3-dimensional images from a single motion picture video film having a plurality of frames containing successive images which are produced from a single video camera displaced along an axis substantially perpendicular to a subject being filmed. The method comprises producing the motion picture video film from a single camera which is supported by a displaceable means with the subject being filmed remaining substantially stationary. Overlaid or alternating images from copies of the single motion picture video film are mixed and separated by a time delay to produce composite video signals of the overlaid or alternating images to produce the 3-dimensional images. The resultant composite film of images are viewed with eyeglasses having lenses which are conditioned to view separate ones of the overlaid or alternating images simultaneously whereby a viewer person can observe a depth of field in the overlaid composite images.

According to a still further broad aspect of the present invention there is provided a system for producing stereoscopic 3-dimensional images from a single motion picture video film having a plurality of frames containing successive images which are produced from a single video camera displaced along an axis substantially perpendicular to the viewing axis of the camera. The system comprises, in one of its aspects, a pair of video recording devices each loaded with a video film copy of the video film. The recording devices each generate output analog signals representative of the images at an output thereof. The output of each recording device is connected to a multiplexer device for receiving the output analog signals. Mixing means is provided for separating the frames by a time separation while synchronizing said frames in overlaid or alternating relationship. The multiplexer device produces a composite stereoscopic 3-dimensional analog signal for recording on a video film medium of a further video recording device.

In another of its aspects, the system comprises a computer having a recording medium and converting means is associated with the computer for converting analog information signals of the images into digital information signals for storing same on the recording medium. A display screen is associated with the computer. Circuit means is provided to produce composite 3-dimensional digital information signals by generating the digital information signals representative of successive ones of the images superimposed or alternating in synchronism with time delay digital information signals also representative of successive ones of the images. The composite 3-dimensional digital information signals are displayed on the display screen. Eyeglasses having lenses conditioned to view separate ones of the overlaid or alternating images simultaneously are used whereby a viewer person can observe a depth of field in the images displayed and produced by the composite 3-dimensional digital information signals.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
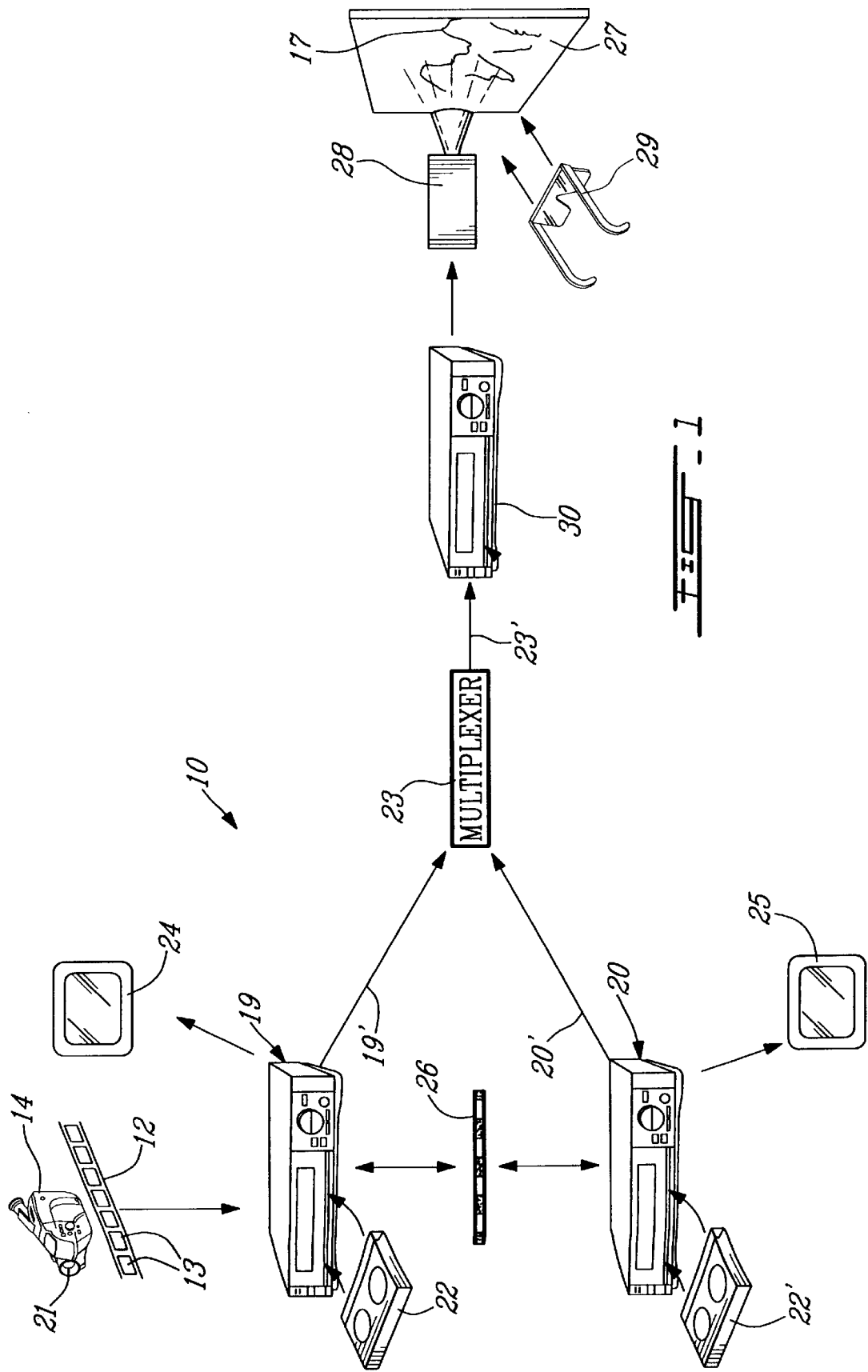
FIG. 1 is a simplified schematic diagram showing the system for producing a composite stereoscopic 3-dimensional film with superimposed time delayed images and using a pair of video recorders feeding a multiplexer device to produce on another video recorder the stereoscopic film which can then be viewed on a screen by the use of special eyeglasses.
Figure 3:
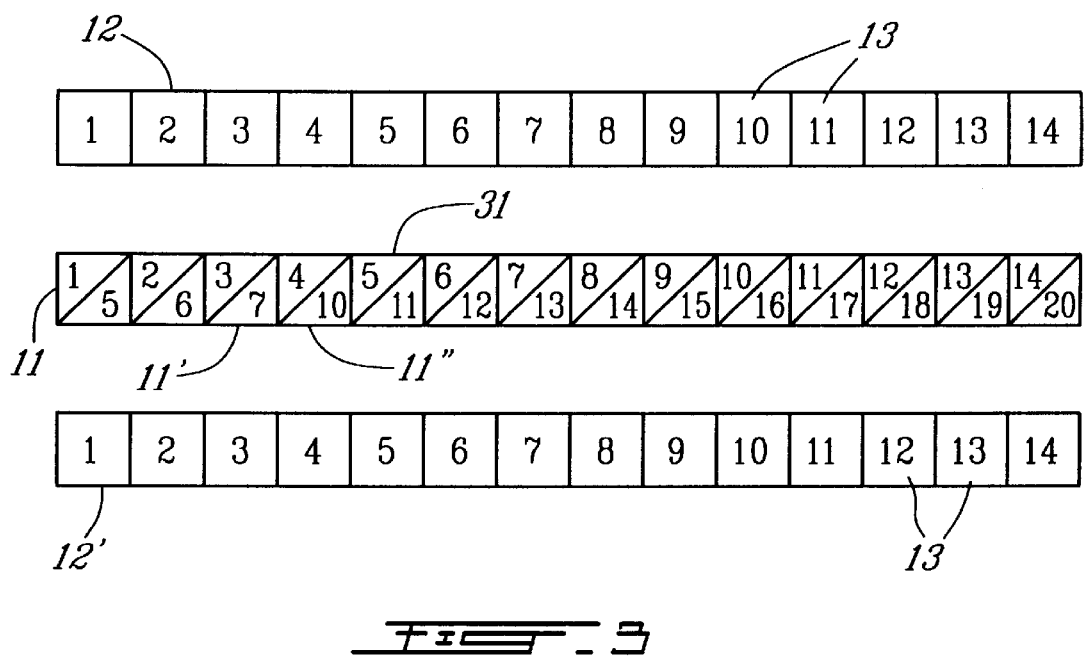
FIG. 3 is a graph diagram illustrating the flexibility of the system to produce a stereoscopic film strip having overlaid images which can vary in time delay over the length of the film strip.
Figure 4:
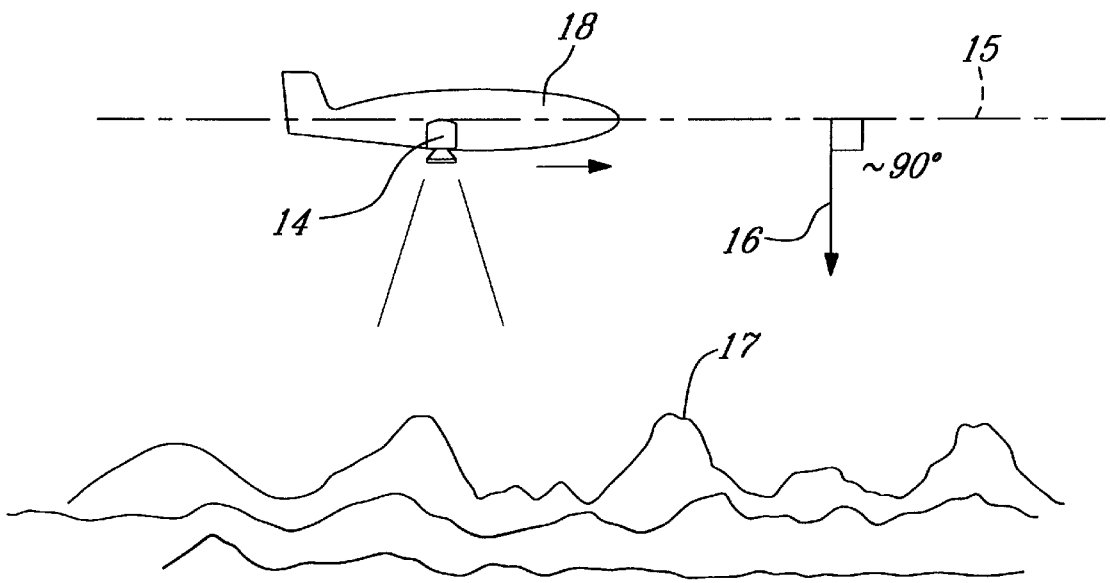
FIG. 4 is a schematic illustration showing how the single motion picture video film is produced.

Referring now to the drawings and more particularly to FIG. 1, there is shown generally at 10 the system of the present invention for producing stereoscopic 3-dimensional images 11 schematically illustrated in FIG. 3. These stereoscopic images 11 are produced from a single motion picture video film 12 which has a plurality of frames 13 containing successive images of a subject and which are produced from a single video camera 14 which is displaced, as shown in FIG. 4, along an axis 15 which is substantially perpendicular, as indicated by arrow 16, to the subject 17, herein a mountain range being recorded. As hereinshown the camera 14 is mounted in an aircraft 18 flying along a flight path indicated by axis 15 and with the viewing axis of the camera disposed substantially perpendicular to the axis 15.

In the system 10 as illustrated in FIG. 1, a pair of video recording devices 19 and 20, of the type well known in the art, are provided and each fed with a copy of the film 12 and 12' herein disposed in cassettes 22 and 22'. It is pointed out that the images in the frames 13 of each film are identical and that the camera 14 records these images through a single lens 21. Accordingly with the system of the present invention a single camera is utilized and no special lens arrangements are necessary to produce the end result stereoscopic images. The video film copies in the cassettes 22 and 22' are loaded in their respective video recorders 19 and 20. At the output of each video recording device, there is generated an output analog signal which is representative of the images. These signals from the outputs 19' and 20' are connected to a multiplexer device 23 for superimposing or placing in an alternating sequence the output analog signals representative of frames.

As hereinshown each of the recording devices 19 and 20 have a respective monitor screen 24 and 25 whereby an operator can view the images at the output thereof. The video recording devices 19 and 20 are also interconnected with a genlock 26 in order to maintain both recording devices 19 and 20 in synchronism. The delayed sequence between the images produced by these signals are viewed on the screens 24 and 25 and the resultant mixed images can also be observed on a screen 27 which is fed the superimposed or alternating images by a projector 28. By the use of special eyeglasses 29, having lenses which are treated or conditioned to view the separate ones of the overlaid or alternating images simultaneously, the viewer person can observe the resultant 3-dimensional images and the depth of field which is created by the overlaid composite images. If the resultant images do not create a sufficient depth of field perception, the recording devices 19 and 20 can then be wound back to modify the mixing of the images or frame and the mixing device 26 is further adjusted whereby to vary the time delay sequence between the frames, and this may be for only a certain period of time whereby a greater time delay is provided at different subject locations to provide a better resultant depth of field perception throughout the film.

As shown in FIG. 1, the output 23' of the multiplexer device is fed to recording device 30 to record on a cassette loaded therein the stereoscopic 3-dimensional analog signals to produce a film strip of composite images producing a desired stereoscopic effect.

Referring now to FIG. 3, there is shown the film strip copies 12 and 12' which are loaded respectively in the recording devices 19 and 20. The composite film strip 11 illustrates the versatility of the present system and its method of operation and wherein it can be seen that a time delay transition zone occurs between the third and fourth frames 11' and 11" of the composite film strip 11. In the last three frames before frame 11', the time delay between the film strips 12 and 12' are four frames, in other words frame 1 of film strip 12 is overlaid by frame 5 of film strip 12'. However, at frame 5 of the composite film strip 11 as indicated by reference numeral 31, the time delay between frames has now shifted to six frames, and frame 11 of film strip 12' is overlaid on frame 6 of the film strip 12 whereby to create an enhanced depth of field perception to obtain a better effect in the resultant 3-dimensional film strip 11.

Figure 2:
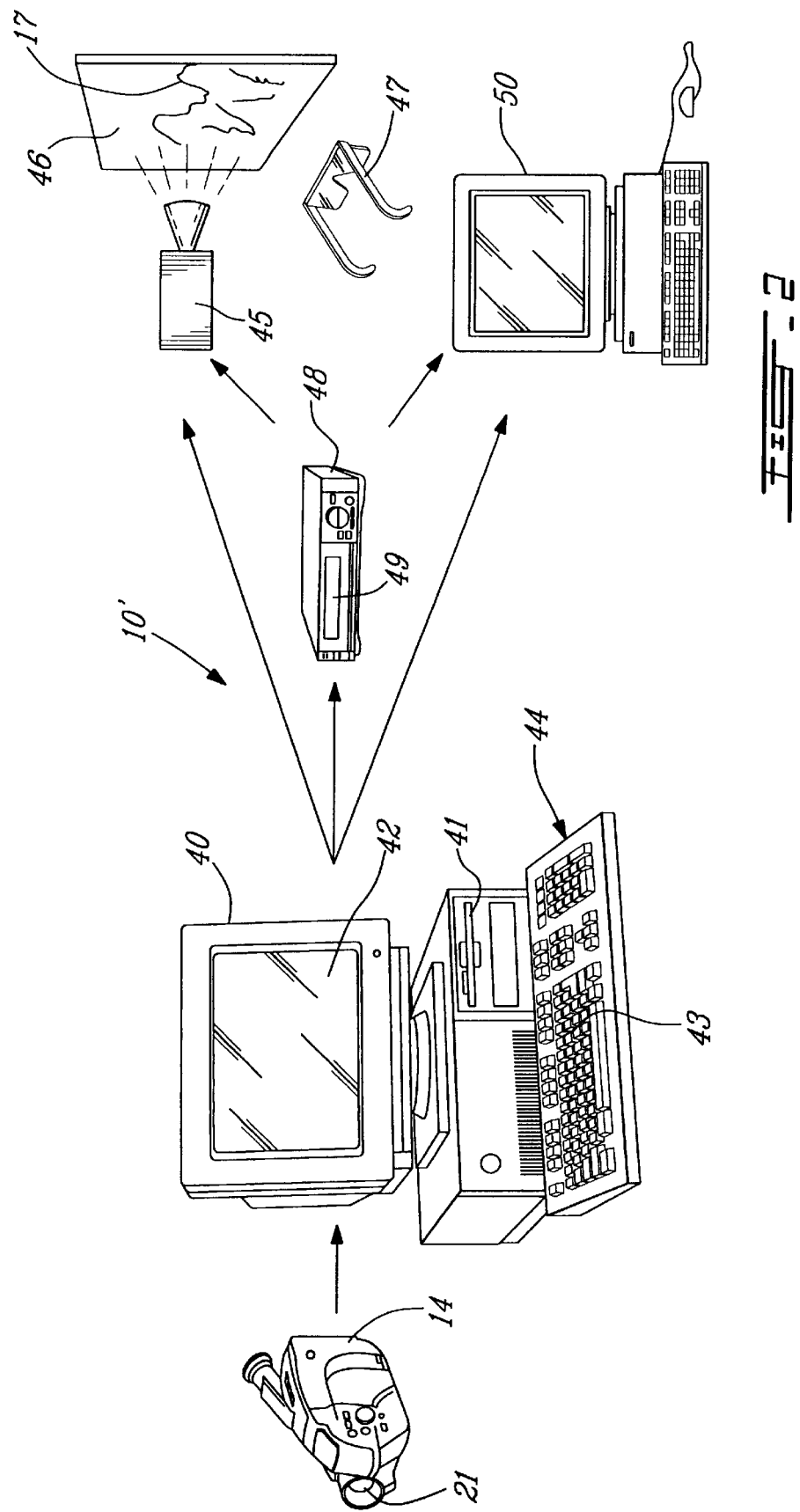
FIG. 2 is a schematic presentation showing a modification of the system wherein the stereoscopic 3-dimensional images are produced by the use of a computer which processes digital information signals.

With reference now to FIG. 2 there is shown a still further version of the system of the present invention. As hereinshown the system indicated by reference numeral 10' comprises a computer 40 having a recording medium, which is hereinshown as a hard disc 41 located in the computer and which is well known in the art, for storing thereon digital information signals of the images produced in the frames 13 of film strip 12, as illustrated in FIG. 1. Of course, the signals may be stored in the memory of the computer rather than the hard disc. The computer 40 is provided with an analog-to-digital converter or else such a converter is connected to the inlet port of the computer to produce digital information signals which can be stored on the hard disc 41. The display screen 42 will display the images corresponding to the digital signal stored in the disc by actuating certain keys 43 on the keyboard 44. The converter may also be fed digital signals directly from a digital camera.

The computer 40 is also provided with a suitable program to produce composite 3-dimensional images from the digital information signals by generating the digital information signals representative of successive ones of the images superimposed or alternating in synchronism with the image frames of successive ones of images. That is to say, the program will make it possible to mix the 3-dimensional digital information signals representative of frames 13 in the film strip 12 to produce overlaid or alternating frames. The mixed composite digital signals can then be fed to either a polarized projector 45 to project on a screen 46 the overlaid or alternating images which can then be viewed by eyeglasses having special lenses 47, as previously described. Alternatively, the computer can feed the composite digital signals to a recording device 48 where the signals can be recorded in digital form or else converted back to analog signals for recording on a film contained in a cassette 49 of the recording device 48 for later viewing or simultaneous viewing through the polarized projector 45. Still further, the output digital signals from the computer can be fed to another computer, hereinshown as a personal computer 50, for viewing at a remote station or for viewing by the operator sitting in front of computer 40 whereby by actuating certain keys as specified by the program, the time delay sequence between images can be modified to again vary the overlaid images, as previously described. The operator would, of course, be wearing the special lenses when effecting the signal mixing.

The method of operation of the present invention can be summarized as follows. Stereoscopic 3-dimensional images are produced from a single motion picture video film which has a plurality of frames containing successive images which are produced from a single video camera displaced along an axis substantially perpendicular to a stationary subject being filmed to produce a video film. Two copies of the same film are loaded into two video recording devices and the films are independently controlled by a mixing device 26, as shown in FIG. 1. These images can be stopped and viewed in respective monitors of the recording devices with the frame of one device being in a different time sequence than the frame of the other device to provide a time separation between the frames to create, in a multiplexer, a composite image from the overlaid time delayed frames. These composite image signals are then recorded on a cassette in a further recording device 30 which can then feed a projector for projecting the composite images on a screen 27 which can then be viewed by using special eyeglasses having polarized or otherwise treated lenses whereby each eye of the viewer can view an associated one of the overlaid images.

The method of operation of the system as shown in FIG. 2 is different in that the analog signals of the film strip 12 are converted to digital signals which are stored on a hard disc 41 of the computer 40. The digital signals may also come directly from a digital camera. The program stored in the computer permits the operator by the use of the keyboard 44 to produce a composite output digital video signal which is the result of overlaid digital image frame signals which are separated in time. This composite digital output signal is then projected on a screen for viewing by the use of special lenses or may be displayed directly on the computer screen or television screen 50 for viewing by the operator and again using eyeglasses. The program permits the operator to freeze the composite signal at specific locations, playback, vary the time separations between overlaid frames thereby providing an editing feature so that the resultant 3-dimensional images have the desired characteristics sought by the operator.

It is within the ambit if the present invention to cover any other obvious modifications of the examples of the preferred embodiment described herein provided such modifications fall within the scope of the appended claims.

I claim:

1. A system for producing stereoscopic 3-dimensional images from a single motion picture video film having a plurality of frames containing successive images which are produced from a single video camera in horizontal motion, said system comprising a computer having a recording medium, means for storing digital information signals on said recording medium, a display screen associated with said computer, a keyboard associated with said computer, program means to produce composite 3-dimensional digital information signals by generating said digital information signals representative of successive ones of said images superimposed or alternating in synchronism with time delayed digital information signals also representative of successive ones of said images, said composite 3-dimensional digital information signals displayed on said screen, a frame stabilizer circuit to monitor and adjust said digital information signals representative of said superimposed or alternating signals to correct horizontal and vertical alignment of said superimposed or alternating signals representative of images in said frames due to said horizontal motion, said program means permitting a user person by means of said keyboard to modify said time delayed digital information signals to vary the position of said superimposed images to modify a 3-dimensional image displayed on said display screen, and eyeglasses having having lenses conditioned to view separate ones of said overlaid or alternating images simultaneously whereby a viewer person can observe a depth of field in said images displayed and produced by said composite 3-dimensional digital information signals.

2. A system as claimed in claim 1 wherein said recording medium is a memory of said computer.

3. A system as claimed in claim 1 wherein said display screen is a computer or television screen.

4. A system as claimed in claim 1 wherein said composite 3-dimensional digital information signals are connected to a video recording device for producing a video film copy of said motion picture video film by converting said digital information signals to analog signals, and a television screen connected to said video recording device for observing said motion picture by said viewer person.

5. A system as claimed in claim 1 wherein there is further provided converting means associated with said computer for converting analog said digit said images into said digital information signals.

\* \* \* \* \*